(12) United States Patent
Yoshida et al.

(10) Patent No.: US 7,307,662 B2
(45) Date of Patent: Dec. 11, 2007

(54) CONTROLLER FOR AUTO-FOCUS IN A PHOTOGRAPHING APPARATUS

(75) Inventors: Akihiro Yoshida, Tokyo (JP); Norihiro Sakaguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1014 days.

(21) Appl. No.: 10/386,568

(22) Filed: Mar. 13, 2003

(65) Prior Publication Data

US 2003/0223009 A1 Dec. 4, 2003

(30) Foreign Application Priority Data

Mar. 13, 2002 (JP) .............................. 2002-068841

(51) Int. Cl.
*H04N 5/232* (2006.01)

(52) U.S. Cl. ..................................... 348/349

(58) Field of Classification Search ............... 348/345, 348/349, 354, 363
See application file for complete search history.

(56) References Cited

U.S. PATENT DOCUMENTS

| | | | |
|---|---|---|---|
| 5,534,916 A | 7/1996 | Sakaguchi | |
| 5,774,623 A | 6/1998 | Maeda et al. | |
| 5,982,430 A * | 11/1999 | Torii | 348/356 |
| 6,037,980 A * | 3/2000 | Takeda | 348/354 |
| 6,075,562 A | 6/2000 | Sakaguchi et al. | |
| 6,380,973 B1 * | 4/2002 | Kawahara | 348/220.1 |
| 6,507,367 B2 * | 1/2003 | Yasuda | 348/355 |
| 6,738,197 B2 * | 5/2004 | Fujii | 359/698 |
| 6,747,704 B1 * | 6/2004 | Kitamura | 348/363 |
| 6,972,798 B1 * | 12/2005 | Takei | 348/349 |
| 7,012,719 B1 * | 3/2006 | Takahashi | 358/474 |
| 2003/0118245 A1 * | 6/2003 | Yaroslavsky et al. | 382/255 |
| 2003/0122969 A1 * | 7/2003 | Higuchi | 348/607 |
| 2005/0249488 A1 * | 11/2005 | Takei | 396/101 |
| 2005/0259175 A1 * | 11/2005 | Hoshuyama | 348/345 |

OTHER PUBLICATIONS

U.S. Appl. No. 09/677,880, filed Oct. 3, 2000, Yoshida et al.
U.S. Appl. No. 10/137,638, filed May 3, 2002, Nakahira et al.
U.S. Appl. No. 10/386,568, filed Mar. 13, 2003, Yoshida et al.
U.S. Appl. No. 10/725,401, filed Dec. 3, 2003, Yoshida.
U.S. Appl. No. 10/761,329, filed Jan. 22, 2004, Sakaguchi.

\* cited by examiner

*Primary Examiner*—Tuan Ho
(74) *Attorney, Agent, or Firm*—Oblon, Spivak, McClelland, Maier & Neustadt, P.C.

(57) ABSTRACT

A photographing apparatus is provided that comprises a lens unit (1), a CCD (2), both of which are used to photograph a subject image, means for processing signal (40) to process output of the CCD (2) into a brightness signal and a color signal, and focus adjustment means (10). An AF evaluating-value obtaining a section (45) for the focus adjustment that obtains an AF evaluating value, which is changed depending on a frequency component of a subject, is provided after an edge emphasizing section (44) of a signal processing circuit.

When performing focus control, with a plurality of sets of parameters for the edge emphasizing section (44) prepared, a plurality of frames are photographed by changing the set of the parameter, and then a difference between arbitrary two AF evaluating values from among a plurality of AF evaluating values obtained, is used to determine a focus moving amount.

7 Claims, 10 Drawing Sheets

Fig.5A
Fig.5B  SIGNAL in (1)
Fig.5C  SIGNAL in (2)
Fig.5D  SIGNAL in (3)
Fig.5E  (2)-(1) PROCESSING
Fig.5F  (2)-(3) PROCESSING
Fig.5G
Fig.5H  EDGE EXTRACTON
Fig.5I
Fig.5J

CONTROLLER FOR AUTO-FOCUS IN A PHOTOGRAPHING APPARATUS

BACKGROUND OF THE INVENTION

1. Field of the Invention

The present invention relates to a photographing apparatus, more specifically, to a controller for auto-focus in the photographing apparatus such as a digital camera or the like.

2. Description of the Prior Art

AF (Auto-focus) is required to operate as fast as possible in a photographing apparatus (hereinafter simply referred to as a "camera") such as a digital camera or the like.

Conventionally, in AF technique of cameras utilizing a charge coupled device (CCD), a circuit for obtaining values for evaluating the AF is disposed in the preceding stage of an edge emphasizing section of a signal circuit, and thus the integral of a high frequency component of image data itself determined by a subject and a photographing optical system is used as an AF evaluating value. AF processing is performed in such a manner that the AF evaluating value is maximized. Generally, in this case, an entire lens- moving area covering from the closest range photographable (hereinafter simply referred to as a "close position") to an infinite distance (hereinafter simply referred to as a "infinity") is checked and roughly adjusted at predetermined intervals to search for a vicinity of a focus position. Further, this limited area or vicinity is subjected to fine adjustment, thereby obtaining focusing.

This type of conventional AF has the following disadvantages.

That is, the conventional type of AF takes a relatively long time to perform the auto-focusing in use.

Further, in the case of photographing a subject having brightness lower than a predetermined limit, output of the CCD becomes so small that dark current noise, which is called random noise in general, is remarkably increased.

Under these conditions, distribution of an AF evaluating value for the focus position is complicated and has a plurality of maxima, thus causing focusing characteristics of the AF to deteriorate.

SUMMARY OF THE INVENTION

An object of the present invention is to constitute a photographing apparatus that allows obtaining of an AF evaluating value in a subsequent stage of an edge emphasizing circuit block, thus acquiring the AF evaluating value dependent on an edge emphasis parameter, and to provide the photographing apparatus that positively makes fill use of the described feature, thereby speeding up AF processing.

To achieve the above-mentioned object, according to a first aspect of the present invention, there is provided a photographing apparatus comprising means for photographing a subject image, means for processing signal to process output from a CCD into a brightness signal and a color signal, and focus adjustment means for adjusting focus.

Further, a block for generating AF evaluating value for the focus adjustment that generates an AF evaluating value, which is changed depending on a frequency component of a subject, is provided after or in a subsequent stage of an edge emphasizing section of a signal processing circuit.

In the present invention having the above-mentioned construction, the AF evaluating value is obtained after the edge emphasis, thereby permitting AF processing to speed up.

DETAILED DESCRIPTION OF THE PREFERRED EMBODIMENTS

Hereinafter some preferred embodiments of the present invention will be described in detail with reference to the accompanying drawings.

Figure 1:
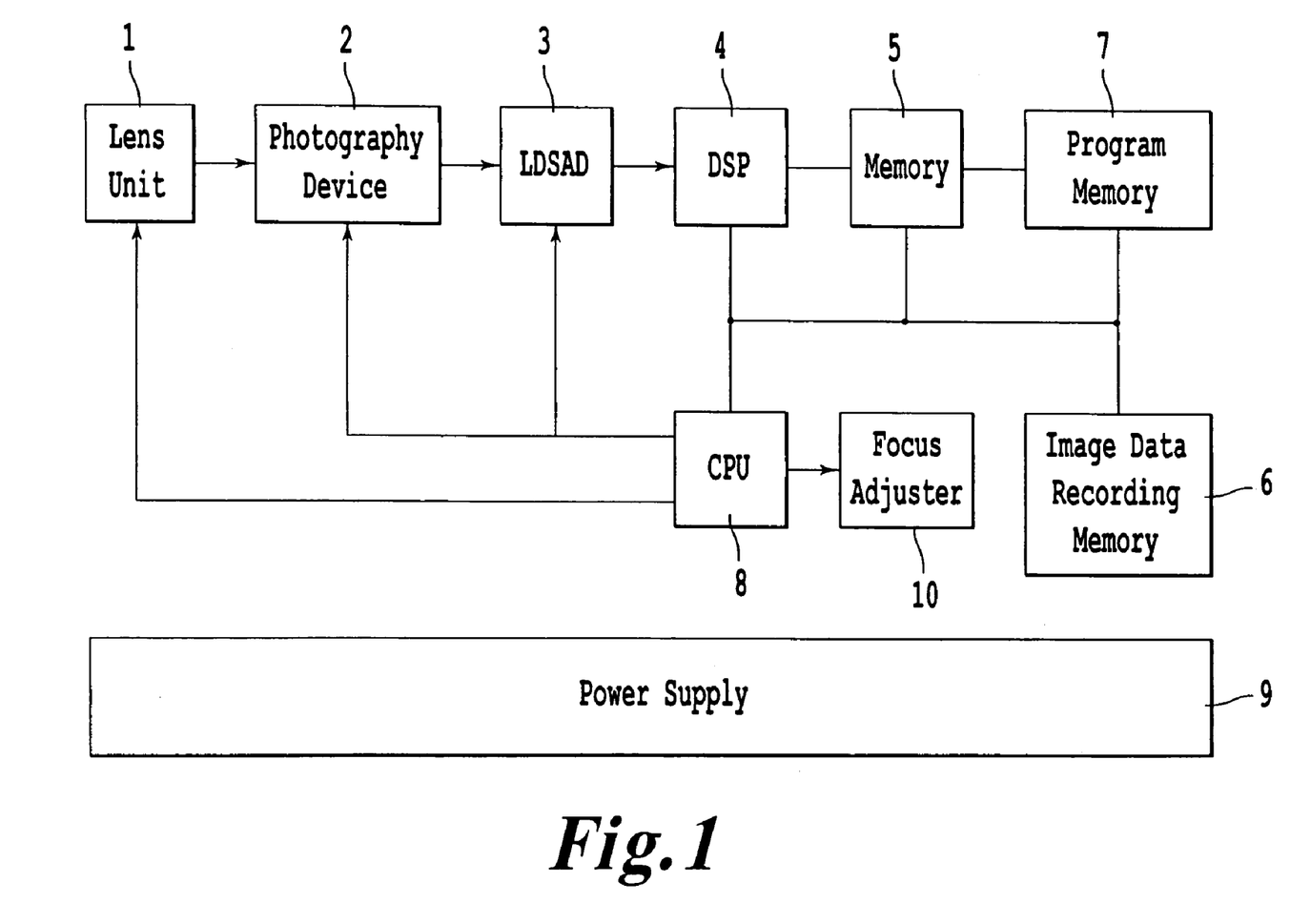
FIG. 1 is an exemplary diagram showing a digital camera as one example of a photographing apparatus according to a preferred embodiment of the present invention.

Referring now to FIG. 1, reference numeral 1 denotes a lens unit (hereinafter simply referred to as a "lens"), reference numeral 2 a photographing device such as a CCD, reference numeral 3 a correlated double sampling device (CDSAD) for performing sampling, automatic gain control (AGC) processing, and A/D conversion of signals from the CCD, and reference numeral 4 a signal processing circuit DSP (digital signal processor) for carrying out processing of signals serving as image data, Reference numeral 5 denotes an image data buffer memory for reading and writing raw data after the A/D conversion, reference numeral 6 an image data recording memory for reading and writing the image data subjected to the signal processing, reference numeral 7 a program memory, reference numeral 8 a CPU, and reference numeral 9 a power supply, respectively.

The CPU 8 detects or senses a state of an outer operating system in the camera and has a function of giving instructions or commands to the DSP 4 and the like.

The operation of the digital camera shown in FIG. 1 will be described below. Output signals from the CCD 2 are A/D-converted via an AGC in the CDSAD 3 to be stored in the image data buffer memory 5 with the arrangement of the CCD 2 maintained. In normally still-frame image processing, CCD data is read from the image data buffer memory 6, so that a brightness signal and a color signal are generated, and then the signals are subjected to JPEG processing to be recorded in the image data recording memory 6.

Figure 2:
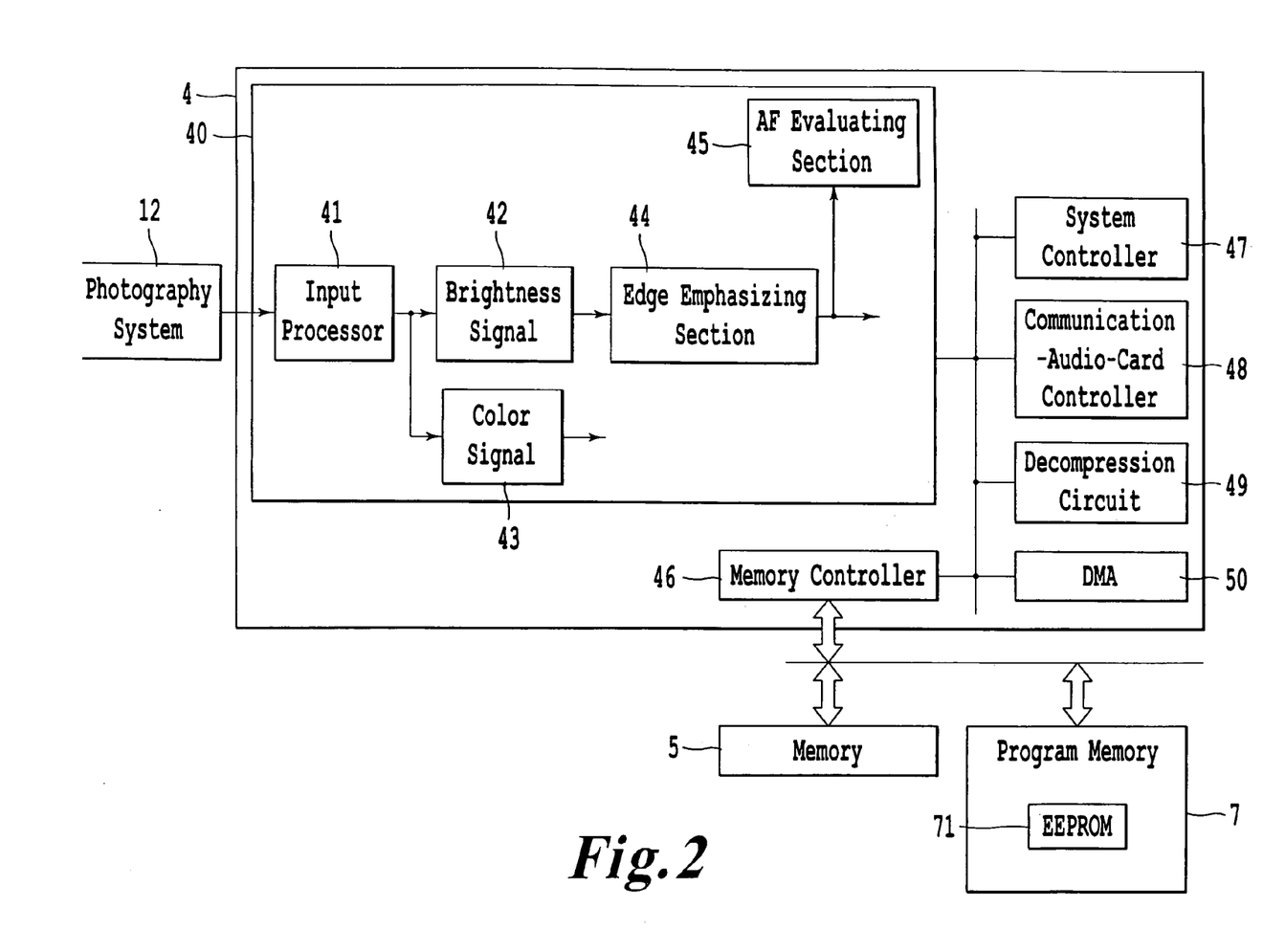
FIG. 2 is a diagram showing the configuration of a digital signal processor (DSP) according to the present invention.

FIG. 2 shows the configuration of the DSP 4 according to the present invention. Image data is inputted from a photographing system 12 comprising the lens unit 1, the CCD 2, and the CDSAD 3, then to be stored in the image data buffer memory 5. Once the data is stored in the image data buffer memory 5, it is read by an input processor 41 and converted into a brightness signal 42 and a color signal 43 within the DSP4. A section 45 for obtaining an AF evaluating-value is disposed in or connected to a subsequent or rearward stage of an edge emphasizing section 44.

As various parameters for the edge emphasizing section 44, are used parameters previously kept or held in an electrically erasable programmable ROM (EEPROM) 71 of the program memory 7. An AF evaluating value is written in a register not shown within the DSP 4.

Focus adjustment means 10 is provided for adjustment of focus. By moving a position of at least one of a lens in the lens unit 1 and the CCD 2, the means 10 adjusts focus from the position.

A memory controller 46, a system controller 47, a communication-audio-card controller 48, a JPEG compression and decompression circuit 49, a direct memory access (DMA) 50, and the like may be equivalent components used in the conventional DSP circuit, and hence explanation thereof will be omitted.

Figure 3:
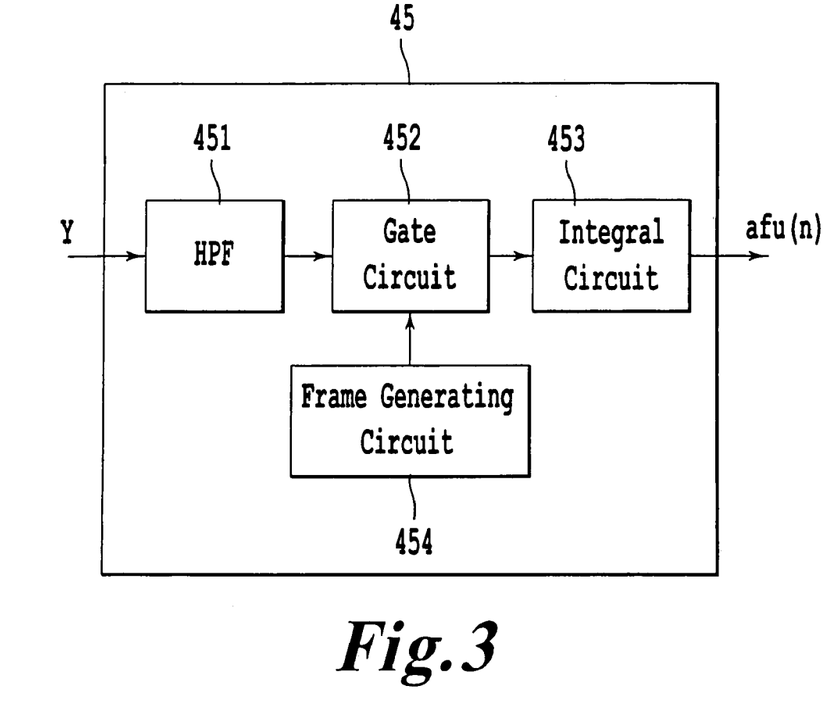
FIG. 3 is a diagram showing means for obtaining an AF evaluating value.
Figure 4:
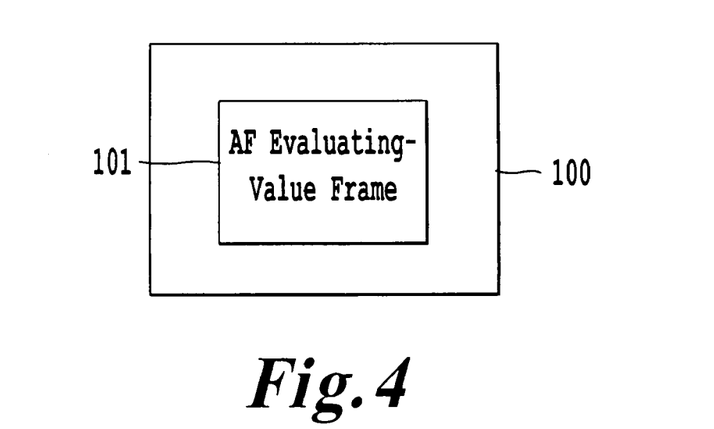
FIG. 4 is an exemplary diagram showing a range of calculating the AF evaluating value.

FIG. 3 shows the AF evaluating-value obtaining section 45 serving as AF evaluating-value obtaining means. FIG. 4 shows one example of a range of calculating the AF evaluating value.

FIG. 4 will be first explained below. As shown in the figure, a range where focusing is obtained or achieved in an image screen 100, that is, an AF evaluating-value calculation range 101 is determined or set.

This range is referred to as an AF evaluating-value frame. Although this AF evaluating-value frame is arbitrarily set, a range including the center of the screen is preferably set as the frame. Means for setting the AF evaluating-value frame in a circuit manner is an AF evaluating-value frame generating circuit 454 described later.

After the image data is divided into the brightness signal 42 and the color signal 43 within the DSP 4 of FIG. 2, the brightness signal 42 passes through the edge emphasizing circuit 44 to be supplied to a high pass filter (HPF) 451 of the AF evaluating-value obtaining section 45 as shown in FIG. 3. (This signal is designated by a Y signal in the figure.) The high pass filter 451 extracts a high frequency component of the brightness signal. A level of the high frequency component of this brightness signal 42 is detected or sensed to be supplied to a gate circuit 452.

The gate circuit 452 receives a window signal for setting the AF evaluating-value frame 101 from the AF evaluating-value frame generating circuit 454, so that a detected output at predetermined timing, corresponding to the AF evaluating-value frame 110, is retrieved to be supplied to an integral circuit 453. The integral circuit 453 integrates the high frequency component level of the brightness signal 42, thereby obtaining the AF evaluating value.

FIG. 5 is a diagram showing the process of signal processing in edge emphasis.

Figure 5A:
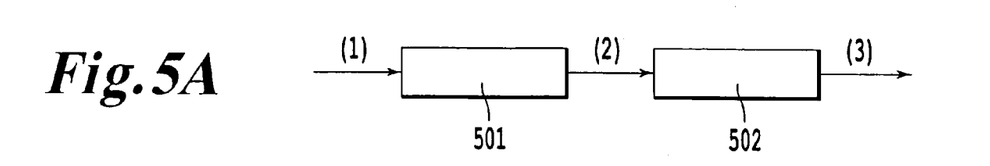
FIG. 5 is a diagram showing the process of signal processing in edge emphasis.
Figure 5B:
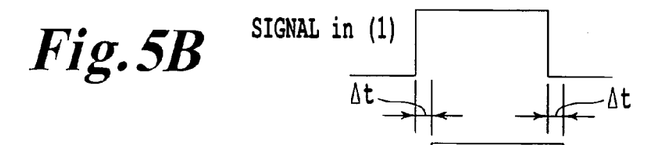
Figures 5C, 5D, 5E, 5F, 5G, 5H, 5I, 5J:
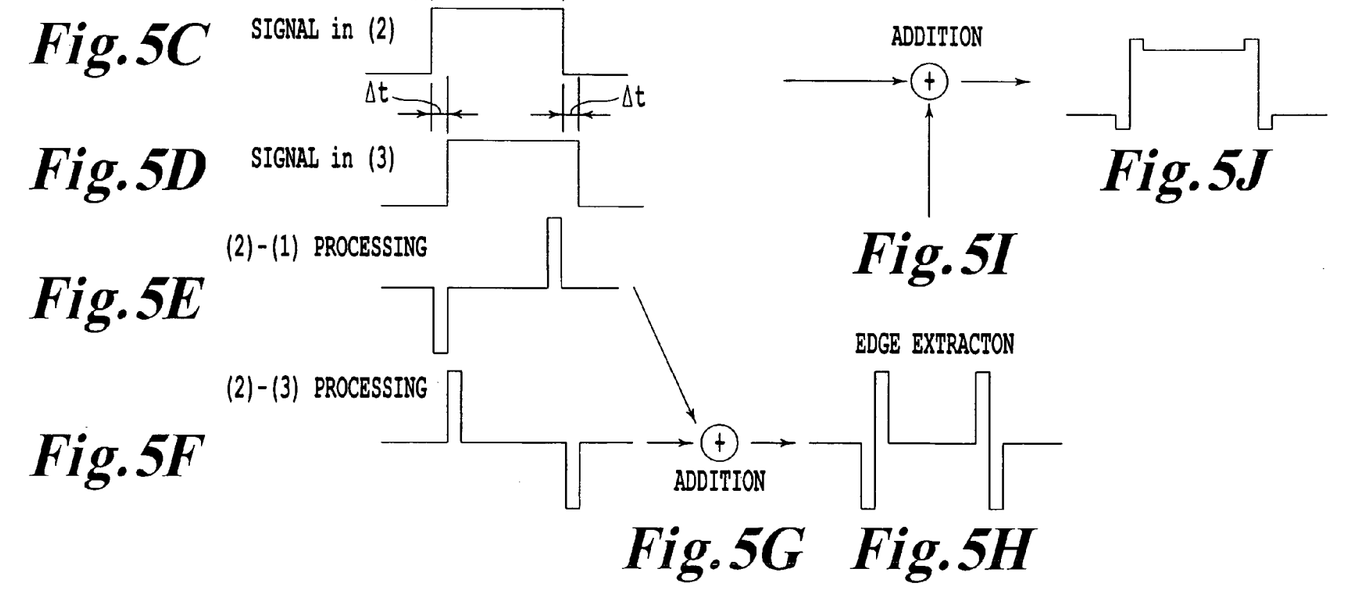

In FIG. 5, waves (1), (2), and (3) as shown in FIGS. 5, (b), (c), and (d) indicate parts of waves of video signals (brightness signals) appearing at respective points before or after passing $\varDelta W$ delay circuits 501 and 502 of FIG. 5(a). From these signals, an arithmetic computation (2)-(1) as shown in FIG. 5(e) and an arithmetic computation (2)-(3) as shown in FIG. 5(f) can be obtained. Further, from an addition of these results (see FIG. 5 (g)), an edge extracted signal as shown in FIG. 5 (h) can be obtained. If this extracted signal is subjected to aperture processing described later, which is shown in FIG. 6, and then added to the (2) signal (see FIG. 5 (i)), finally a video signal with its edges emphasized can be obtained as shown in FIG. 5

Figure 6:
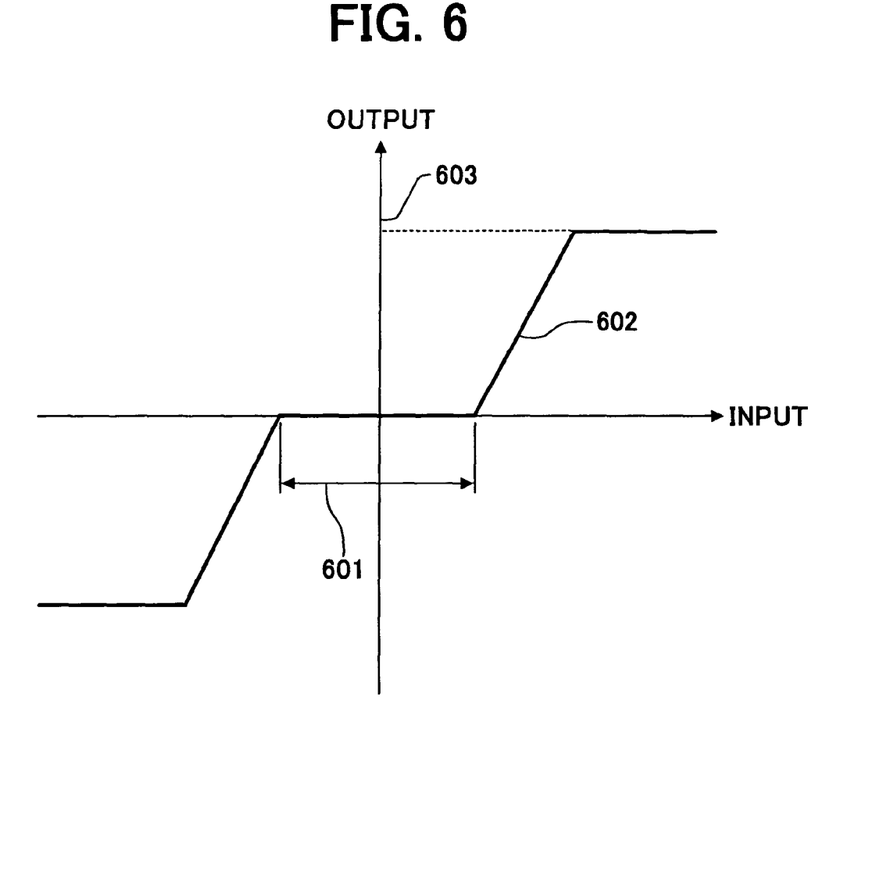
FIG. 6 is a diagram showing a principle of aperture processing.

FIG. 6 shows the principle of the aperture processing.

In FIG. 6, a horizontal axis (designated as "input") indicates the level of an input signal, while a vertical axis (designated as "output") indicates the level of an output signal. A range 601, designated by an arrow, denotes a width of core ring, a slant 602 in this graph an aperture gain, and an upper limit 603 of the output an aperture limit.

The aperture processing is to determine a degree of the edge emphasis for the edge extracted signal as shown in FIG. 5 (h), by means of a function comprising the above-mentioned width of core ring 601, the aperture gain 602, and the aperture limit 603. The width of core ring 601 plays a role in regarding a smaller input signal than the width itself as noise and cutting it so as to prevent noise components of a signal from being emphasized by the edge emphasis. The aperture limit 603 plays a role in determining a maximum amplitude of an edge emphasis component.

In the AF evaluating, these values are intentionally selected as distinct from a normally photographing time such that the edge emphasis is effected, whereby a difference between the AF evaluating values is exhibited large.

Figure 7:
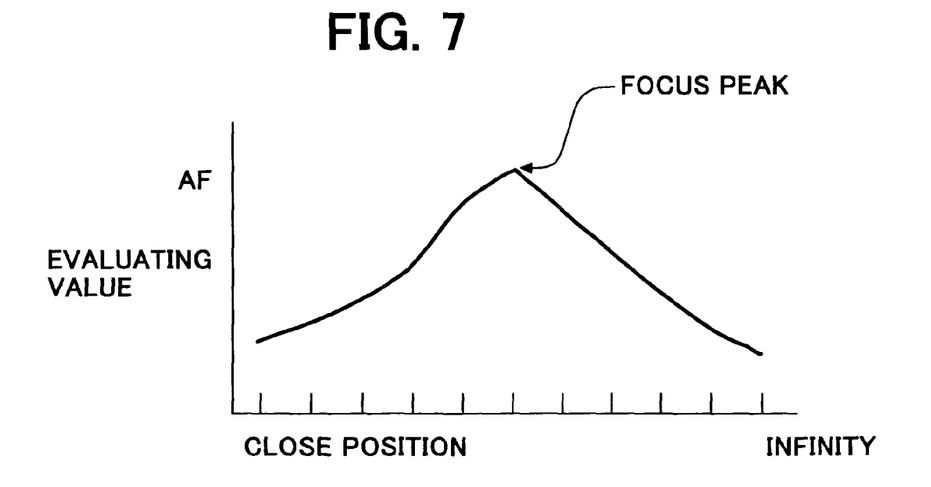
FIG. 7 is a diagram showing typical distribution of AF evaluating-value depending on a lens position.

FIG. 7 shows typical AF evaluating-value distribution depending on a lens position. When a subject having sufficient contrast and brightness is photographed, distribution obtained has a peak at one position as shown in the figure. This peak corresponds to a focus position. By scanning the possible lens positions from a close position to the infinity or from the infinity to a close position, the CCDAF searches for this AF evaluating-value peak, resulting in obtaining focusing of the image.

Figure 8:
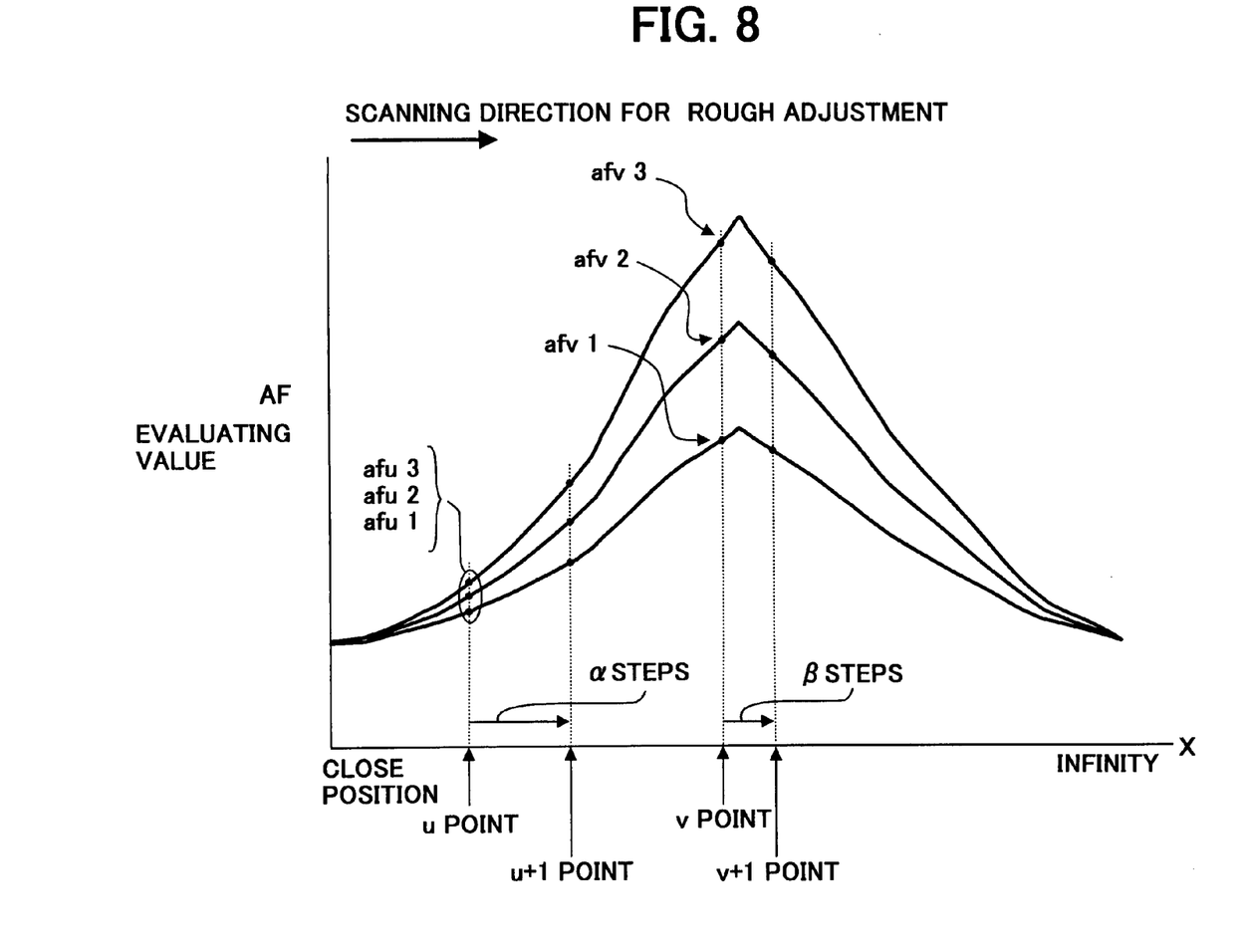
FIG. 8 shows an example of the present invention.

FIG. 8 shows an example of the present invention. In this example, the scanning direction of the CCDAF is set from a close position to the infinity, and three different sets of edge emphasis parameters are set for one lens position.

In FIG. 8, a horizontal axis X designates the number of steps indicative of a moving amount of the lens, wherein one step corresponds to a predetermined small moving amount thereof with the focus depth of the lens considered. In rough adjustment, the lens is moved by a plurality of steps at a time.

Figure 9A:
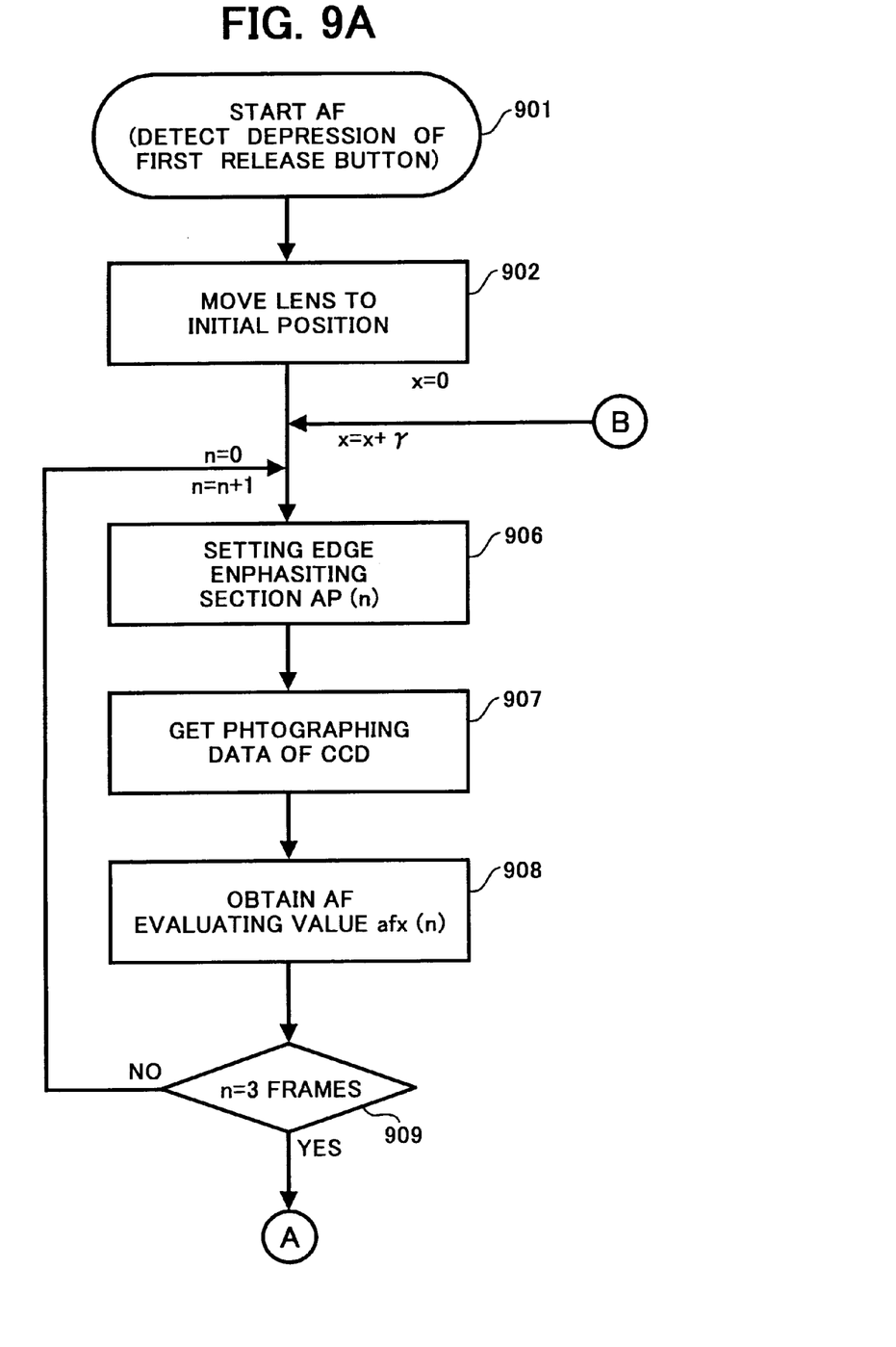
FIG. 9 is a flowchart showing the processing of FIG. 8.
Figure 9B:
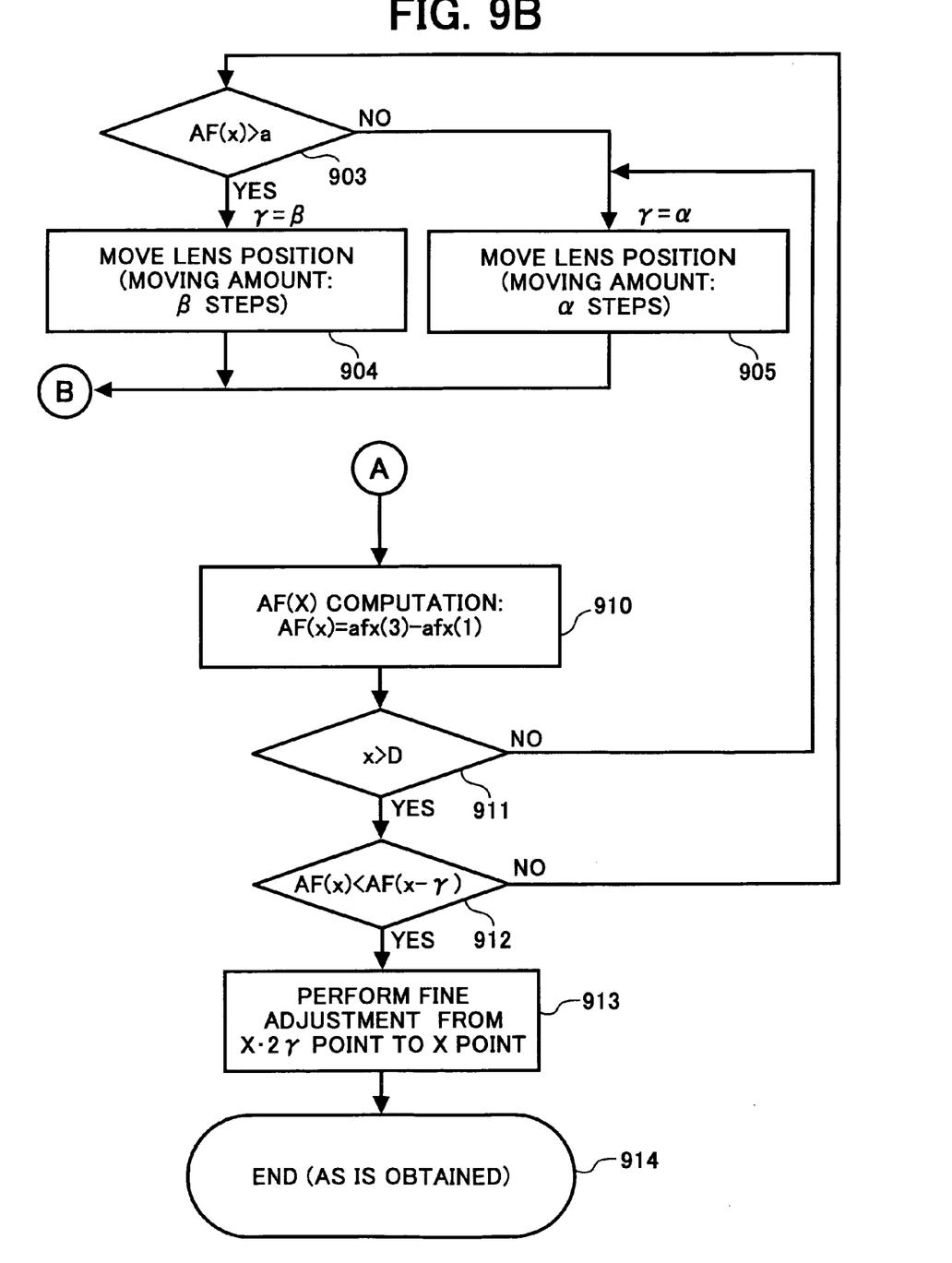

FIG. 9 is a flowchart showing the processing of FIG. 8. Referring now to FIG. 9, the processing of FIG. 8 will be explained below.

When the CPU 8 detects depression of a first release button of the camera, namely a half depression state, and when AF is started (step 901 in FIG. 9), first at least one of the lens in the lens unit 1 and the CCD 2 is moved to a close position as an initial position (step 902 in FIG. 9). Then from this position, the lens in the lens unit 1 or the CCD2 starts rough adjustment of focus.

In the case of "the initial position x=0", there is no AF evaluating value to be compared with. First, photographing is carried out to acquire three frames. Each frame is assigned edge emphasis parameters AP(1) to AP(3), thus obtaining AF evaluating values af0(1) to af0(3)(steps 906 to 908 in FIG. 9).

In more detail, if an edge emphasizing section AP (n) is set in the step 906 of FIG. 9, then CCD photographing data photographed by the CCD 2 is grabbed or taken into the signal for processing signal 40 in a step 907 of FIG. 9.

Then an AF evaluating value is obtained by the section 45 for obtaining the AF evaluating-value in the step 908 of FIG. 9.

Note that these parameters, namely three sets of the edge emphasis parameters AP (1) to AP (3), have the relationship AP (1)<AP (2)<AP (3), which relationship is obtained by making a comparison among the degrees of edge emphasis.

Further, the number of sets of the edge emphasis parameters is not limited to three. If necessary, two or more thereof may be employed. In a step 909 of FIG. 9, it is checked whether all computations for the three frames are finished or not.

After the computations of the three frames are finished, an AF evaluating-value difference, designated as AF(0)=af0 (3)–af0(1), is figured out in a step 910 of FIG. 9.

It should be noted that to obtain the AF evaluating-value difference, the invention is not limited to the above-mentioned example. Two arbitrary AF evaluating values may be used to get the difference. Since the initial position is generally far from a focus position, a constant α is unconditionally set, thus leading to γ=α (step 911 in FIG. 9). Subsequently, in a step 905 of FIG. 9, x+γ is substituted for x, and then the operation returns to the step 906 in FIG. 9, whereby the same computations are repeatedly performed.

Provided that a relationship x=u is effected at one time as shown in FIG. 8, for example, AF evaluating values obtained at a u point are afu(1) to afu(3), and an AF evaluating-value difference obtained is an AF(u) at this time.

In a previous computation, an AF evaluating-value difference already obtained has been an AF (u–γ) at a u–γ point.

Herein, the γ value may be the α as described above, or β as described later. The AF evaluating-value difference is likely to increase in an increasing function manner from the initial position. But, if a magnitude relation of the AF evaluating values is reversed, then it is understood that the lens has already passed through a focus position.

In this case, in a step 912 of FIG. 9, it is judged that the lens has already passed through the focus position. Thereafter, final fine adjustment is carried out (step 913 in FIG. 9), thereby obtaining auto-focusing in a step 914 of FIG. 9, coming to an end of focus adjustment processing.

If the magnitude relation is not reversed yet, that is, in cases where the AF (u) is not greater than a threshold value a in the step 912 of FIG. 9, the operation returns to the step 903 in FIG. 9.

It should be noted that although the above-mentioned value a is a predetermined threshold value preset, it may be one dependent on any one of values afu(1) to afu(3). Therefore, if the value AF(u) is smaller than the value a, the moving amount to a next rough adjustment position u+γ will be set to correspond to α steps as the number of steps, that is, a relation γ=α is set (steps 905 and 906 in FIG. 9).

Although at a point v as shown in FIG. 8, the same processing as that at a point u is performed, there are lots of high frequency components at the point v because this point is near a focus position, leading to the large amount of change in the AF evaluating value for a set of parameters, thus resulting in a relation: AF (V)=afv (3)–afv (1)>a. A constant β (α>β) is set in the step 904 of FIG. 9, whereby the moving amount to a next point for rough adjustment V+γ is β steps, that is, γ=β.

During the above-mentioned series of steps, AP (2) is not substantially utilized. But it may be used to refer to characters of afx (1) to afx (3) so as to determine optimal edge emphasis parameters in photographing of still-frame images.

Three parameter sets each having a different width of core ring, namely, three sets of parameters AP(1), AP(2), and AP(3) all of which have the relation AP(1)<AP(2)<AP(3), is utilized in the AF operation, while the AP(2) having a middle level of emphasis degree is normally used for still-frame images to perform image processing.

However, when the AP(2) is possibly embedded in a noise component due to subject information obtained in the AP, that is, when a difference in AF evaluating value between a close point or infinity and a focus position is smaller than a predetermined threshold value, the AP (3) having bigger width of core ring is used to perform image processing.

In cases where the number of parameter sets is greater than three, a parameter set or an AP having a bigger width of core ring is utilized in sequence, as required. Note that in the case of setting the AGC relatively high due to small output from the CCD2, which case is different from the above-mentioned one, the AP (3) may be automatically employed as mentioned later.

Figure 10:
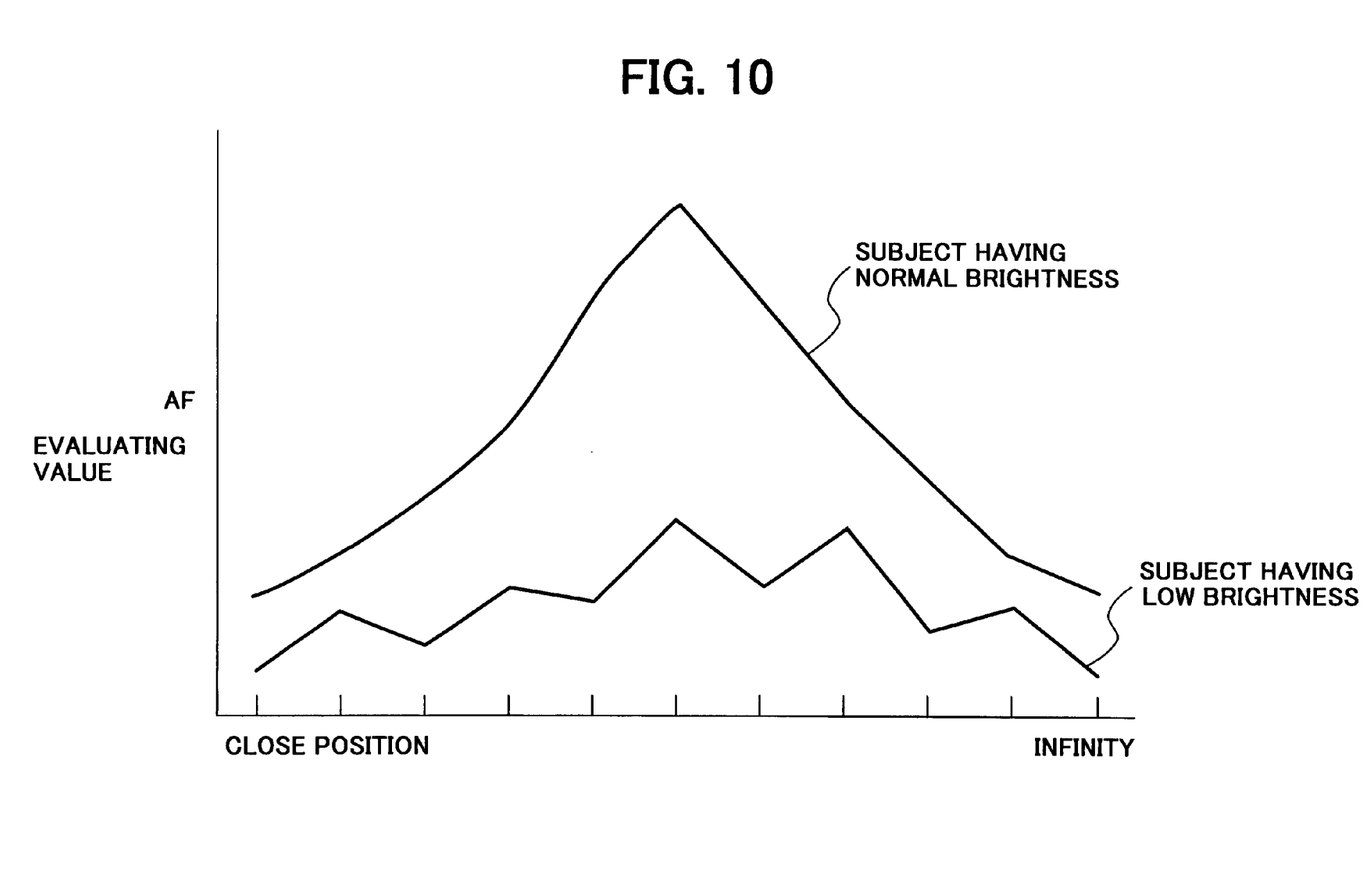
FIG. 10 is a diagram showing distribution of AF evaluating-value for a subject having low brightness.

FIG. 10 shows an AF evaluating-value distribution of a typical subject and an AF evaluating-value distribution of a subject having low brightness. This low brightness subject receives such an extremely bad influence due to dark current noise of the CCD2 that an absolute AF evaluating value is likely to become low and to have a plurality of peaks, resulting in a slow AF processing and deterioration in AF accuracy.

To cope with such a subject, the following measures will be taken.

Figure 11:
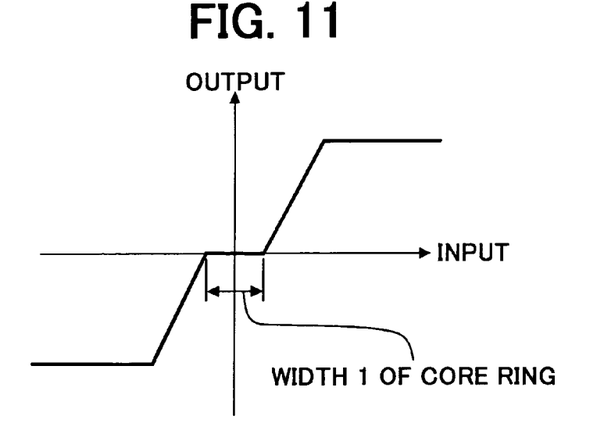
FIG. 11 is a diagram showing an example in which width of a core ring is changed by an automatic gain control (AGC).
Figure 12:
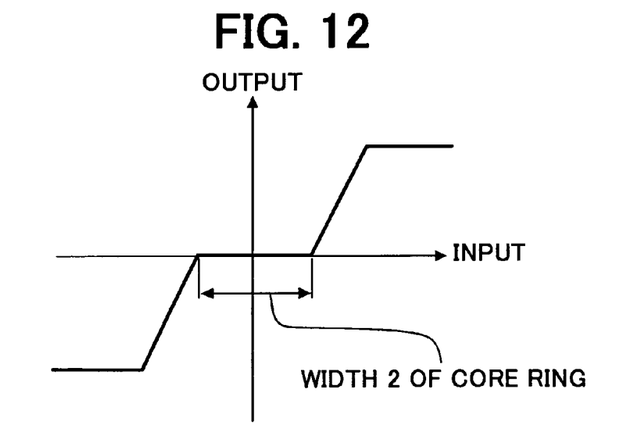
FIG. 12 is a diagram showing another example in which the width of core ring is changed by the AGC.
Figure 13:
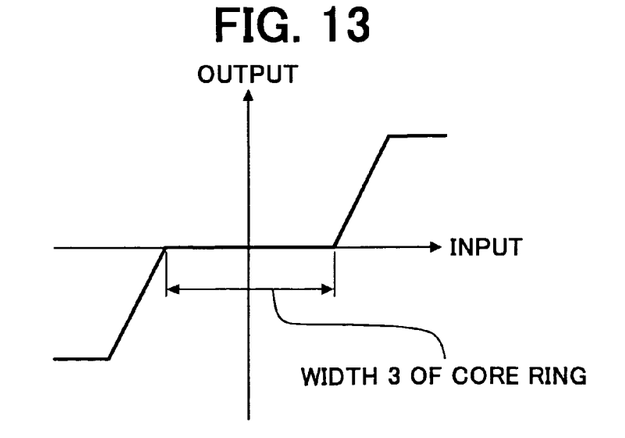
FIG. 13 is a diagram showing still another example in which the width of core ring is changed by the AGC.

FIGS. 11, 12, and 13 shows examples in which the width of core ring is changed by the AGC.

Normal auto exposure (AE) control includes switching control for switching automatic gain control AGC in several steps according to subject brightness. Over a normal brightness subject, the dark current noise of the CCD has little influence. So, a relatively narrow width of core ring 1 is set as shown in FIG. 11.

When subject brightness is under a standard, the AE control raises a setting value of the AGC, but simultaneously an influence of noise occurs.

For this reason, the width of core ring is widened as shown in FIG. 12 so as to avoid deterioration in AF accuracy due to the noise influence (a width of core ring 2). If the subject brightness becomes much lower and the AGC setting value is raised more, the width of core ring is more widened as shown in FIG. 13 (a width of core ring 3). These widths are to be determined in accordance with noise inherent in a circuit. Therefore an optimal value of the width is dependent on design.

When performing focus control, with a plurality of sets of parameters for the edge emphasizing section prepared, a plurality of frames is photographed by changing the parameter set, and then a difference between arbitrary two AF evaluating values from among a plurality of AF evaluating values obtained, is used to determine a focus moving amount.

That is, in AF processing, a plurality of frames are photographed by varying a combination of the width of core ring, the aperture gain, and the aperture limit. Then a width (difference) between the AF evaluating values each obtained from the corresponding frame is used to determine a next moving amount of focus.

Note that focus movement means that a relative distance between a lens and a photographing device is changed so as to match the photographing device to a focus surface of the lens. Actually, either the lens of the lens unit 1 or the CCD2 may be moved, but in the above description, the lens is moved in order to facilitate understanding of the description.

When the difference between the AF evaluating values calculated from the respective edge emphasis parameter sets is smaller than a predetermined value, it is judged that the focus position is distant. Thus, a moving amount of the lens to a next rough adjustment point is taken large. When the AF evaluating-value difference is larger than a predetermined value, it is judged that the focus position is near, and thus a moving amount of the lens to a next rough adjustment point is taken small.

The AF evaluating value is obtained after the edge emphasis, thereby speeding up the AF processing so as to improve AF accuracy influenced by noise.

When obtaining the AF evaluating value, parameters such as amplitude of an emphasis component in the edge emphasizing section, the width of core ring thereof, or the like, which are different from those when normally photographing, are utilized.

Thus, the edge emphasis parameters which are set in the AF processing have values extremely different from those of parameters used in photographed images considering the optimization of image quality. This emphasizes a change in the difference between the AF evaluating values obtained at the focus position and the non-focus position.

Therefore, parameters that are not used in normal still-frame images are utilized in the AF processing, thereby achieving the AF processing with high accuracy.

When starting the rough adjustment of focus, first the focus position is moved to a close position or the infinity, and then an AF operation is started.

Thus, based on the AF evaluating value obtained after the edge emphasis, a position where next rough adjustment is performed is appropriately changed, thereby speeding up the rough adjustment. Further, a range for sequent fine adjustment can be limited, thereby speeding up the fine adjustment.

In this photographing apparatus, the plurality of frames is photographed with the width of core ring changed, and the AF evaluating value is obtained for each photographing. Thus, the level of noise included in subject information is determined, so that the information is reflected to each parameter such as an edge emphasis coefficient of signal processing when regular photographing.

For example, in an AF computation, a combination of the width of core ring and the aperture gain is varied to obtain the AF evaluating values of the plural frames. In photographing after the AF processing, the width of core ring and an aperture gain appropriate to image quality are determined based on the AF evaluating values of the plural frames obtained just before the photographing.

Thus, when photographing still-frame images, the selection of edge emphasis parameters is changed according to a subject, thereby providing optimal recorded images.

If the output from the photographing device is small when obtaining the AF evaluating values, the width of core ring of an edge emphasizing block is controlled to extend.

That is, in cases where the output from the photographing device is small in obtaining the AF evaluating values, for example when a subject has low brightness, the width of core ring of the edge emphasizing block is controlled to extend.

Thus, the width of core ring is widened for the subject having the low brightness, resulting in low noise influence, thus achieving the AF processing with high accuracy.

In particular, when obtaining the AF evaluating values, the width of core ring of the edge emphasizing block is controlled or altered by a gain value of the AGC.

That is, in the AE control, as the setting value of the AGC becomes large, the width of core ring is widened, so that the AF accuracy is kept.

Thus, widening of the width of core ring reduces the noise influence, thereby achieving the AF processing with high accuracy.

Therefore, the values of the edge emphasis parameters are switched among by setting the above-mentioned AGC, leading to the AF processing having improved high accuracy.

What is claimed is:

1. A photographing apparatus, comprising:
a photographic system configured to photograph a subject image;
an imaging element connected to the photographic system;
a signal processing circuit configured to separate image data sent from the imaging element into a brightness signal and a color signal;
an edge emphasizing section configured to perform edge emphasis of the brightness signal and the color signal which are separated;
an AF evaluation-value obtaining section configured to obtain an AF evaluation value; and
a focus adjustment device connected to the AF evaluation-value obtaining section,
wherein the AF evaluation-value obtaining section is connected after the edge emphasizing section and is configured to obtain the AF evaluation value based on the brightness signal to which the edge emphasis is performed, and
wherein the focus adjustment device is configured to control a focus of the photographic system based on the AF evaluation value obtained by the AF evaluation-value obtaining section.

2. The photographing apparatus according to claim 1,
wherein, when performing focus control, a plurality of sets of parameters for the edge emphasizing section are prepared,
wherein, a plurality of frames are photographed by changing the set of the parameter, and
wherein, a difference between arbitrary two AF evaluating values from among a plurality of AF evaluating values obtained is used to determine a focus moving amount.

3. The photographing apparatus according to claim 1,
wherein, when obtaining the AF evaluating value, a parameter, such as an amplitude of an emphasis component in the edge emphasizing section and width of a core ring thereof, which parameter is different from that in normally photographing, is utilized.

4. The photographing apparatus according to claim 1,
wherein, when starting the rough adjustment of the focus, a focus position is first moved to a close position or an infinite position, and then an AF operation is started.

5. The photographing apparatus according to claim 1,
wherein, by changing the width of core ring, the plurality of frames are photographed, and the AF evaluating value is obtained for each photographing, thereby determining a noise level included in subject information to reflect the information throughout each parameter such as an edge emphasizing coefficient of the signal processing when regular photographing.

6. The photographing apparatus according to claim 1,
wherein, in a case where the output from the CCD is small when obtaining the AF evaluating value, the width of core ring of the edge emphasizing section is controlled to widen.

7. The photographing apparatus according to claim 6, wherein,
when obtaining the AF evaluating value, the width of core ring of the edge emphasizing section is controlled to be changed by a gain value of an AGC.

* * * * *